(12) United States Patent
Surapaneni et al.

(10) Patent No.: US 9,599,524 B2
(45) Date of Patent: Mar. 21, 2017

(54) HIGH-RESOLUTION FLEXIBLE TACTILE IMAGER SYSTEM BASED ON FLOATING COMB ELECTRODE

(71) Applicant: University of Utah Research Foundation, Salt Lake City, UT (US)

(72) Inventors: Rajesh Surapaneni, Hillsboro, OR (US); Carlos H. Mastrangelo, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 97 days.

(21) Appl. No.: 14/245,709

(22) Filed: Apr. 4, 2014

(65) Prior Publication Data
US 2014/0298921 A1    Oct. 9, 2014

Related U.S. Application Data

(60) Provisional application No. 61/853,447, filed on Apr. 4, 2013.

(51) Int. Cl.
*G01L 5/10* (2006.01)
*G01L 1/14* (2006.01)
(Continued)

(52) U.S. Cl.
CPC .............. *G01L 1/146* (2013.01); *G01L 5/165* (2013.01); *G01L 25/00* (2013.01)

(58) Field of Classification Search
CPC ......... G01L 1/146; G01L 5/165; G01L 25/00; G01L 5/228; G01L 1/00; G01L 1/02;
(Continued)

(56) References Cited

U.S. PATENT DOCUMENTS 7,137,300 B2 * 11/2006 Aoyagi ................. G01P 15/125
361/280
7,457,724 B2   11/2008 Vock et al.
(Continued)

FOREIGN PATENT DOCUMENTS

| CN | 102143695 | 8/2011 |
| JP | 2011524207 | 9/2011 |
| WO | 2009152456 | 12/2009 |

OTHER PUBLICATIONS

A high-resolution flexible tactile imager system based on floating comb electrodes, Rajesh Surapaneni Electr. & Comput. Eng., Univ. of Utah, Salt Lake City, UT, USA, Yan Xie ; Qingbo Guo ; Darrin J. Young ; Carlos H. Mastrangelo, Published in: Sensors, 2012 IEEE Date of Conference: Oct. 28-31, 2012 pp. 1-4.*
(Continued)

*Primary Examiner* — Harshad R Patel
*Assistant Examiner* — Brandi Hopkins
(74) *Attorney, Agent, or Firm* — Workman Nydegger

(57) ABSTRACT

A flexible tactile imager includes an array of sensing cells that measure shear force and normal force. The sensing cells include a first sub-cell and a second sub-cell. Each sub-cell includes multi-fingered capacitors configured to measure shear force in a first or second direction and to measure the normal force. The multi-fingered capacitors include a flexible printed circuit board, a comb-like fingered sense electrode and drive electrode patterned on a layer of the flexible printed circuit board, a deformable dielectric material positioned above the comb-like fingered sense and drive electrodes, the comb-like fingered floating electrode patterned above the deformable dielectric material, a first capacitance formed between the comb-like fingered sense electrode and the comb-like fingered floating electrode, and a second
(Continued)

capacitance formed between the comb-like fingered drive electrode and the comb-like fingered floating electrode.

18 Claims, 8 Drawing Sheets

(51) Int. Cl.
  *G01L 25/00* (2006.01)
  *G01L 5/16* (2006.01)
(58) Field of Classification Search
  CPC ... G01D 5/2417; G01D 5/1655; B25J 13/084; B25J 19/00; G01N 3/24
  USPC ....... 73/862.041, 862.68, 846, 841, 77, 636; 901/33, 46
  See application file for complete search history.

(56) References Cited

U.S. PATENT DOCUMENTS

| | | | |
|---|---|---|---|
| 7,983,876 | B2 | 7/2011 | Vock et al. |
| 8,583,402 | B2 | 11/2013 | Yuen et al. |
| 8,599,165 | B2 | 12/2013 | Westhues et al. |
| 2008/0007539 | A1* | 1/2008 | Hotelling ............... G06F 3/044 345/173 |
| 2009/0043531 | A1 | 2/2009 | Kahn et al. |
| 2010/0063779 | A1 | 3/2010 | Schrock et al. |
| 2010/0257933 | A1* | 10/2010 | Verjus ............... G01C 19/5755 73/504.04 |
| 2011/0057899 | A1* | 3/2011 | Sleeman ............... G01L 1/146 345/174 |
| 2012/0029819 | A1 | 2/2012 | Mastrangelo et al. |
| 2012/0038583 | A1 | 2/2012 | Westhues et al. |
| 2013/0268236 | A1 | 10/2013 | Yuen et al. |

OTHER PUBLICATIONS

V. J. Lumelsky, M. S. Shur, and S. Wagner, "Sensitive Skin," IEEE Sensors J., vol. 1, No. 1, pp. 41-51, Jun. 2001.

M. H. Lee, "Tactile Sensing; New Directions, New Challenges," Int. J. Rob. Res., vol. 19, No. 7, pp. 636-643, Jul. 2000.

D. Johnson, Ping Zhang, J. Hollerbach and S. Jacobsen, "A Full Tactile Sensing Suite for Dexterous Robot Hands and Use in Contact Force Control," *Robotics and Automation, 1996. Proceedings., 1996 IEEE International Conference on*, vol. 4, pp. 3222-3227 vol. 4, Apr. 22-28, 1996.

M. Y. Cheng, C. L. Lin and Y. J. Yang, "Tactile and Shear Stress Sensing Array Using Capacitive Mechanisms with Floating Electrodes," *Micro Electro Mechanical Systems (MEMS), 2010 IEEE 23$^{rd}$ International Conference on*, pp. 228-231, Jan. 24-28, 2010.

Angermann et al., "A High Precision Reference Data Set for Pedestrian Navigation Using Foot-Mounted Inertial Sensors," Indoor Positioning and Indoor Navigation (IPIN), 2010 International Conference on Digital Object Identifier, pp. 1-6.

Jianping Yu et al., "Simulation Analysis on Characteristics of a Planar Capacitive Sensor for Large Scale Measurement," Intelligent Computation Technology and Automation, 2009, ICICTA Second International Conf.pp. 201-204.

Qingbo Guo et al., "Characterization of Electrical Interferences for Ground Reaction Sensor Cluster," Sensors, 2012, IEEE, p. 1-4.

Saradain et al., "Gait Analysis of a Human Walker Wearing Robot Feet as Shoes," Robotics and Automation, 2001, IEEE International Conference, vol. 3, pp. 2285-2292.

Surapaneni et al., "A Highly Sensitive Flexible Pressure and Shear Sensor Array for Measurement of Ground Reactions in Pedestrian Navigation," Solid-State Sensors, Actuators and Microsystems Conf. (Transducers), 2011.

Suster et al., "Low-Interface Sensing Electronics for High-Resolution Error-Correcting Biomechanical Ground Reaction Sensor Cluster," Sensors, 2010, IEEE, p. 1020-1023.

U.S. Apple. No. 13/192,328, filed Dec. 26, 2013, Notice of Allowance.

Guo et al., "High-Performance Interface Electronic System for a 13 × 13 Flexible Biomechanical Ground Reaction Sensor Array Achieving a Gait Ground Velocity Resolution of 100," Sensors Journal, Nov. 2013, IEEE; vol. 13, Issue 11; pp. 4496-4505.

Surapaneni et al., "A High-Resolution Flexible Tactile Imager System Based on Floating Comb Electrodes," Sensors, Oct. 2012.

* cited by examiner (a)

HIGH-RESOLUTION FLEXIBLE TACTILE IMAGER SYSTEM BASED ON FLOATING COMB ELECTRODE

CROSS-REFERENCE TO RELATED APPLICATIONS

This application is a non-provisional of, and claims priority to and the benefit of, U.S. Provisional Patent Application Ser. No. 61/853,447 filed on Apr. 4, 2013 and entitled "HIGH-RESOLUTION FLEXIBLE TACTILE IMAGER SYSTEM BASED ON FLOATING COMB ELECTRODE," which application is hereby expressly incorporated herein by this reference in its entirety.

BACKGROUND

Tactile sensors are a group of sensors that are widely being developed for transduction of touch, force and pressure in the field of robotics, contact sensing and gait analysis. These sensors are employed to measure and register interactions between contact surfaces and the surrounding environment. Since these sensors have gained usage in the field of robotics and gait analysis, there is a need for these sensors to be ultra-flexible, highly reliable and capable of measuring pressure and two-axial shear simultaneously. The sensors that are currently available are not capable of achieving all the aforementioned qualities.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Exemplary embodiments of the invention will become more fully apparent from the following detailed description and appended claims, taken in conjunction with the accompanying drawings. It is understood that this discussion describes only exemplary embodiments and are, therefore, not to be considered limiting of the invention's scope. It will also be understood that the use of the terms "first", "second", etc. in describing two or more elements in the specification and the claims is meant to distinguish one element from another and is not meant to imply numerical order unless explicitly stated as implying numerical order.

Embodiments disclosed herein are related to durable tactile imager arrays (FTI) that are able to withstand large deformation cycles. The flexible tactile imagers disclosed herein may be used in such applications as gait analysis, robotic grippers, and wind shield wiper systems. It will be appreciated that other applications may be implemented.

Example FTI System

Figure 1:
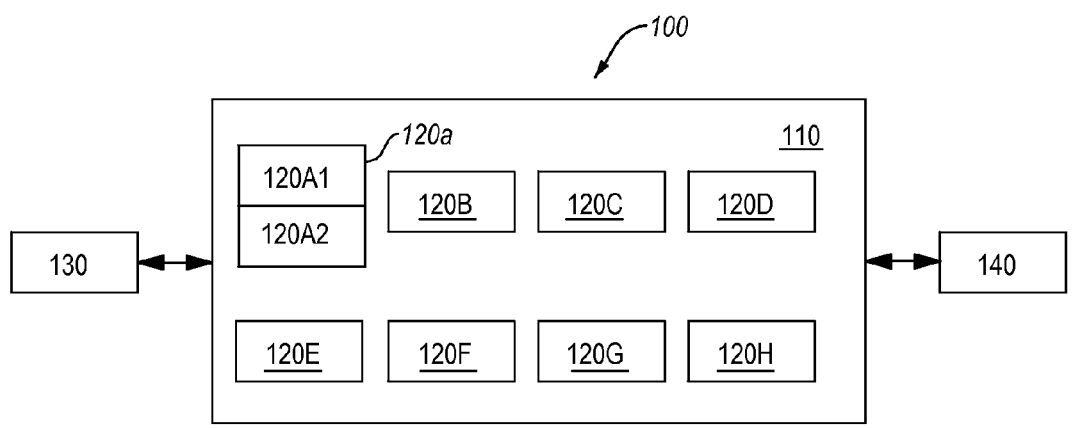
FIG. 1 illustrates a flexible tactile imager array (FTI) and system according to the embodiments disclosed herein.

Attention is first given to FIG. 1, which illustrates a flexible tactile imager array (FTI) and system in accordance with an embodiment disclosed herein. As illustrated, the array includes a flexible printed circuit board 110 upon which the array 100 is implemented. The flexible printed circuit board 110 may include various layers and will be discussed in more detail to follow.

The array 100 is implemented by multiple sensing cells 120, illustrated herein as sensing cells 120A-120H. Each of the sensing cells 120 may include one or more multi-fingered capacitors that are used to measure normal force and shear force as will be explained in more detail to follow. It will be appreciated that the number of sensing cells 120 shown in FIG. 1 is for illustration only and that the flexible tactile imager array 100 will typically include a larger number, although a smaller number is also contemplated. In one embodiment, the FTI array 100 includes 169 sensing cells 120 that are implemented in an area of about 53×57 mm squared.

The various sensing cells 120 may be of various dimensions as circumstances warrant. For example, in one embodiment the sensing cells 120 may be 4.28×4.16 mm squared. Accordingly, the size of the sensing cells 120 is not to be limiting of the embodiments disclosed herein.

The sensing cells may be further divided into two sub-cells. For example, FIG. 1 shows that sensing cell 120 is divided into a sub-cell 120A and sub-cell 120B. Although not illustrated, the other sensing cells 120 may also be divided into two sub-cells. In one embodiment, the sub-cell 120 may be an X-cell that measures shear force in an x-direction (first direction) in addition to measuring normal force. In the embodiment, the sub-cell 120 may be a Y-cell that measures shear force in a y-direction (second direction) in addition to measuring normal force.

In one embodiment, each of the sensing cells 120 may include four of the multi-fingered capacitors that are used to measure normal force and shear force. In such embodiments, two of the multi-fingered capacitors may comprise the sub-cell 120A and two of the multi-fingered capacitors may comprise the sub-cell 120B.

FIG. 1 also includes a drive system 130 and a sense system 140. The drive system is used to drive the multi-fingered capacitors of the sensing cells 120 using drive lines that will be explained in more detail to follow. The sense system 140 is used to measure the output of the shear and normal pressure using sense lines as will be discussed. It will be appreciated that the drive system 130 and the sense system 140 may be any reasonable system as circumstances warrant.

Figure 2:
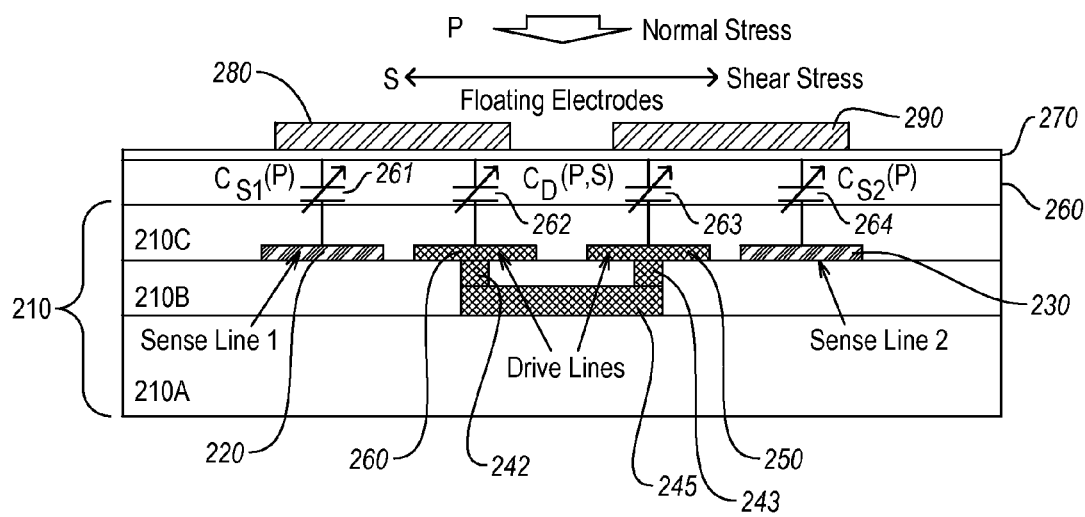
FIG. 2 illustrates a cross-section of a sensing cell according to the embodiments disclosed herein.

Turning to FIG. 2, a cross-section of an example embodiment of a portion of a sensing cell 200, such as sensing cell 120A, is illustrated. It will be appreciated that all of the sensing cells 120 may be implemented as the sensing cell 200.

As shown, the sensing cell 200 includes a flexible printed circuit board 210 upon which elements of the sensing cell 200 are formed, positioned, or patterned. In the illustrated embodiment, the flexible printed circuit board 110 includes a base layer 210A and layers 210B and 210C. However, it will be appreciated that the printed circuit board 210 may include more or less than the illustrated number of layers.

A comb-like fingered sense electrode 220 and 230 and a comb-like fingered drive electrode 240 and 250 are patterned or included in the same layer of the flexible circuit board 210. In some embodiments, the comb-like fingered sense electrodes 220 and 230 and the comb-like fingered drive electrodes 240 and 250 are 150 μm wide, although other widths are also contemplated by the embodiments disclosed herein. As illustrated, the comb-like fingered drive electrodes 240 and 250 are interconnected by via holes 242 and 243 and by an interconnect 245. These electrodes may be implemented in copper or any other suitable material.

The sensing cell 240 also includes a deformable dielectric material layer 260 positioned above the flexible printed circuit 110 and the comb-like fingered sense electrodes 220 and 230 and the comb-like fingered drive electrodes 240 and 250. In some embodiments, the deformable dielectric material may be PDMS although other types of deformable dielectric materials may also be used as circumstances warrant. In some embodiments the deformable dielectric material layer 260 may be 10 μm thick, although other thicknesses are also contemplated.

In further embodiments, a barrier and adhesion layer 270 may be positioned above the deformable dielectric material layer 260. The layer 270 may be a 1 μm thick Parylene layer. It will be appreciated that other materials and/or thicknesses may be used to implement the layer 270.

The sensing cell 240 also includes comb-like fingered floating electrodes 280 and 290 that are patterned on top of or above the deformable dielectric material layer 260 and the layer 270. In some embodiments, the comb-like fingered floating electrodes 280 and 290 are made of chromium and/or gold, although other materials may also be used. In some embodiments, the comb-like fingered floating electrodes 280 and 290 may be 400 μm wide, although other widths are also contemplated.

As is illustrated, the comb-like fingered floating electrodes 280 and 290 completely cover the sense electrodes 220 and 230 respectively. However, the comb-like fingered floating electrodes 280 and 290 only partially cover the drive electrodes 240 and 250 respectively, thereby creating a floating electrode offset 245 and 255 with respect to the drive electrodes 240 and 250. The offsets 245 and 255 are used to generate the shear output measurement signal as will be explained in more detail.

As is further illustrated in FIG. 2, a capacitance 261 ($C_{S1}(P)$) is formed between the comb-like fingered floating electrode 280 and the comb-like fingered sense electrode 220. A capacitance 262 ($C_D(P,S)$) is formed between the comb-like fingered floating electrode 280 and the comb-like fingered drive electrode 240.

Likewise, FIG. 2 shows that a capacitance 263 ($C_{S2}(P)$) is formed between the comb-like fingered floating electrode 290 and the comb-like fingered sense electrode 230. A capacitance 264 ($C_D(P,S)$) is formed between the comb-like fingered floating electrode 290 and the comb-like fingered drive electrode 250.

In operation, a force, either normal or shear, that is applied to one or both of the floating electrodes 280 and 290, may cause the deformable dielectric material layer 260 to deform, thereby changing the distance between the floating electrode and the sense and drive electrodes. This change in distance may cause a change in one or more of the capacitances 261-264. It is this change in capacitance that is used to measure the change in normal and sheer pressure or force as will be explained in more detail to follow.

Figure 3A:
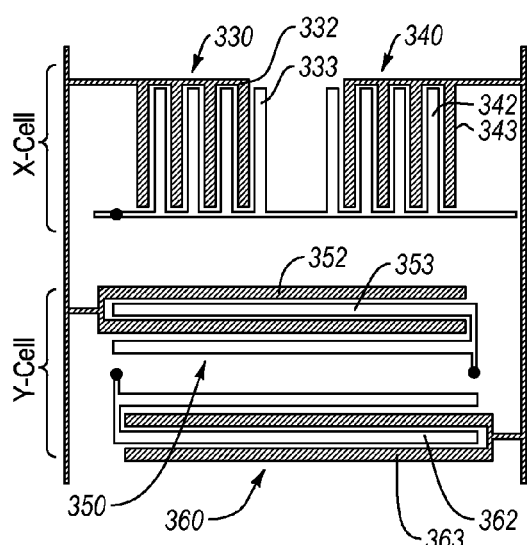
FIG. 3A illustrates an X-cell and a Y-cell according to the embodiments disclosed herein.

As previously described, the sensing cells may be divided into two sub-cells, such as sub-cells 120A and 120B. FIG. 3A illustrates an embodiment of an X-cell 310 and a Y-cell 320, which may be examples of the sub-cells 120A and 120B. As illustrated, the X-cell 310 is orthogonal to the Y-cell 320. The X-cell 310 may measure shear force or pressure in the x-direction as indicated by the line 311 while the Y-cell 320 may measure shear force or pressure in the y-direction as indicated by the line 321. Both the X-cell 310 and the Y-cell 320 are able to measure normal force or pressure.

The X-cell 310 includes a first multi-fingered capacitor 330 that is comprised of comb-like fingered floating electrodes 331 and comb-like fingered sense electrodes 332 and drive electrodes 333. As illustrated in FIG. 3D, there are four comb-like floating electrodes 331 and as illustrated in FIG. 3A there are four comb-like fingered sense electrodes 332, and comb-like fingered drive electrodes 333. In the embodiment, a single comb-like fingered electrode 331 is associated with one comb-like fingered sense electrodes 332 and one comb-like fingered sense electrodes 333 that form an interwoven pair. That is, the single comb-like fingered electrode 331 covers the entire associated comb-like finger electrode 332 and partially covers the associated comb-like fingered drive electrode 333 as discussed in relation to FIG. 2. Accordingly, in the illustrated embodiment, the four comb-like fingered floating electrodes 331 each cover a pair of interwoven comb-like fingered sense electrodes 332 and comb-like fingered drive electrodes 333 as described.

In other words, for clarity, FIG. 3A is shown without the comb-like fingered floating electrodes 331 being placed on top of the sense and drive electrodes 332 and 333. Rather, FIG. 3D shows the comb-like fingered floating electrodes 331 by themselves so as to clearly show their shape. However, as discussed above, each of the comb-like fingered floating electrodes 331 is placed over a pair of sense and drive electrodes.

The X-cell 310 also includes a second multi-fingered capacitor 340 that is comprised of four comb-like fingered floating electrodes 341 (FIG. 3D) and four comb-like fingered sense electrodes 342 and drive electrodes 343 (FIG. 3A) that are associated with each other in the manner described for capacitor 330. The Y-cell 320 includes a third multi-fingered capacitor 350 that is comprised of two comb-like fingered floating electrodes 351 (FIG. 3D) and two comb-like fingered sense electrodes 352 and drive electrodes 353 (FIG. 3A) that are associated with each other in the manner described for capacitor 330. The Y-cell also includes a fourth multi-fingered capacitor 360 that is comprised of two comb-like fingered floating electrodes 361 (FIG. 3D) and two comb-like fingered sense electrodes 362 and drive electrodes 363 (FIG. 3A) that are associated with each other in the manner described for capacitor 330. It will be appreciated that the floating electrodes, sense electrodes, and the drive electrodes of the X-cell 310 and Y-cell 320 correspond to those discussed above in relation to FIG. 2. It will also be appreciated that an amount of electrodes other than two or four may be implemented as circumstances warrant.

In one embodiment, the length of the comb-like drive and sense electrodes 332, 333, 342, and 343 of the X-cell 310 vary in relation to the length of the drive and sense electrodes 352, 353, 362, and 363 of the Y-cell 320 so that a nominal capacitance of the X-cell 310 and Y-cell 320 substantially match. In the embodiment, the calculated nominal capacitance of the X-cell 310 and Y-cell 320 is 1.2 pF.

FIG. 3A also illustrates that the fingers of the comb-like drive and sense electrodes of the X-cell 310 and Y-cell 320 are interwoven or interlocked as previously discussed. In one embodiment, having the fingers be interwoven or interlocked increases the sensitivity of the shear force measurements. In another embodiment, increasing the number of floating electrodes increases the sensitivity of the shear force measurements. Accordingly, the amount of sensitivity may be at least partially controlled by how many comb-like fingers are implemented in the floating, drive and/or sense electrodes.

Figure 3B:
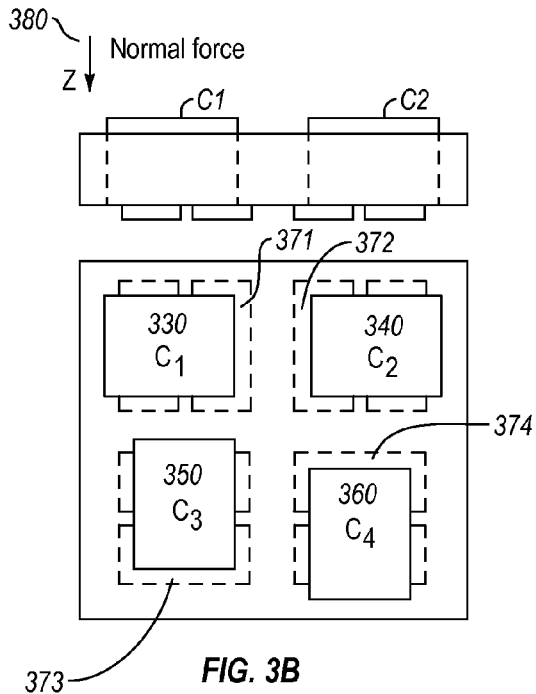
FIG. 3B illustrates the measurement of normal force according to the embodiments disclosed herein.
Figure 3C:
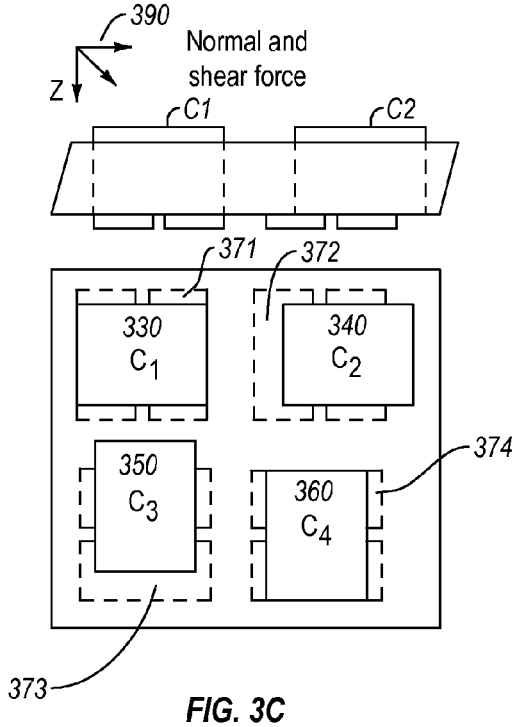
FIG. 3C illustrates the measurement of both shear force and normal force simultaneously according to the embodiments disclosed herein.
Figure 3D:
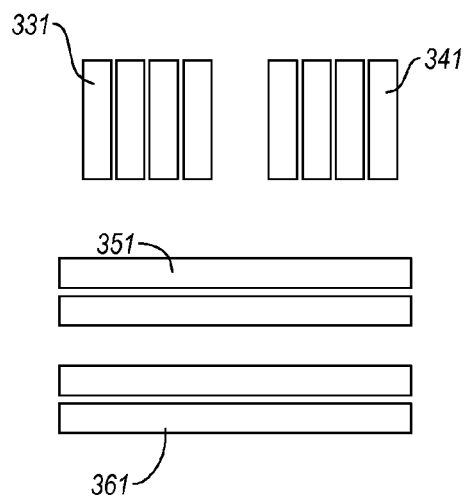
FIG. 3D illustrates comb-like fingered floating electrodes accordingly to the embodiments disclosed herein.

Attention is now given to FIGS. 3B and 3C, which illustrate a simplified view of the multi-fingered capacitors 330-360 (also illustrated as $C_1$, $C_2$, $C_3$, and $C_4$) of the X-cell 310 and Y-cell 320 discussed in relation to FIG. 3A. FIGS. 3B and 3C also illustrate offsets 371, 372, 373, and 374. As discussed previously, the offsets 371-374 are offsets where the floating electrodes do not completely cover the drive electrodes. It will be noted that some of the reference numerals shown in FIGS. 3A and 3D for various elements have been omitted from FIGS. 3B and 3C for clarity. However, such elements may still be referred to when discussing FIGS. 3B and 3C by using their FIGS. 3A and 3D reference numerals.

FIG. 3B illustrates the measurement of normal force as indicated by 380. When normal force is acting alone on the floating electrodes 331, 341, 351, and 361, capacitance increases equally in all four multi-fingered capacitors 330, 340, 350, and 360. Hence, the normal force may be measured by capacitance addition of multi-fingered capacitors 330 and 340, the capacitive addition of multi-fingered capacitors 350 and 360, or the capacitive addition of all four multi-fingered capacitors.

FIG. 3C illustrates the measurement of both shear force and normal force simultaneously. For example, FIG. 3C shows that the offsets 371 and 372 have been moved in the x-direction when compared to FIG. 3B and this indicates that shear force in the x-direction has been applied. Likewise, FIG. 3C shows that the offsets 373 and 374 have been moved in the y-direction when compared to FIG. 3B and this indicates that shear force in the y-direction has been applied.

When shear force in the x-direction is applied in addition to normal force, the capacitance of the multi-fingered capacitor 330 increases while the capacitance of the multi-fingered capacitor 340 decreases. In addition, when shear force in the y-direction is applied in addition to normal force, the capacitance of the multi-fingered capacitor 350 decreases while the capacitance of the multi-fingered capacitor 360 increases. Accordingly, shear force in a given direction in the sensing cell 120 or 200 may be measured by capacitance difference between multi-fingered capacitors 330 and 340 or between multi-fingered capacitors 350 and 360.

The corresponding sensitivities to normal and shear force for the sensing cell 120 or 200 are shown by the following equations:

$$S_P^F = \frac{1}{C}\frac{\partial C}{\partial P} = \frac{1}{E} \quad (1)$$

$$S_{SX}^F = \frac{1}{C}\frac{\partial C}{\partial S} = \frac{N_f \cdot t}{2 \cdot G \cdot w_f} \quad (2)$$

$$S_{SY}^F = \frac{1}{C}\frac{\partial C}{\partial S} = \frac{N_f \cdot t}{G \cdot w_f} \quad (3)$$

where E and G are the elastic (Young's) modulus of the deformable dielectric layer 260, t is the dielectric thickness, $w_f$ is the finger width of the electrodes and $N_f$ is the number of floating electrodes. As mentioned previously, these equations show that the sheer sensitivity increases with the number of fingers.

Figure 4:
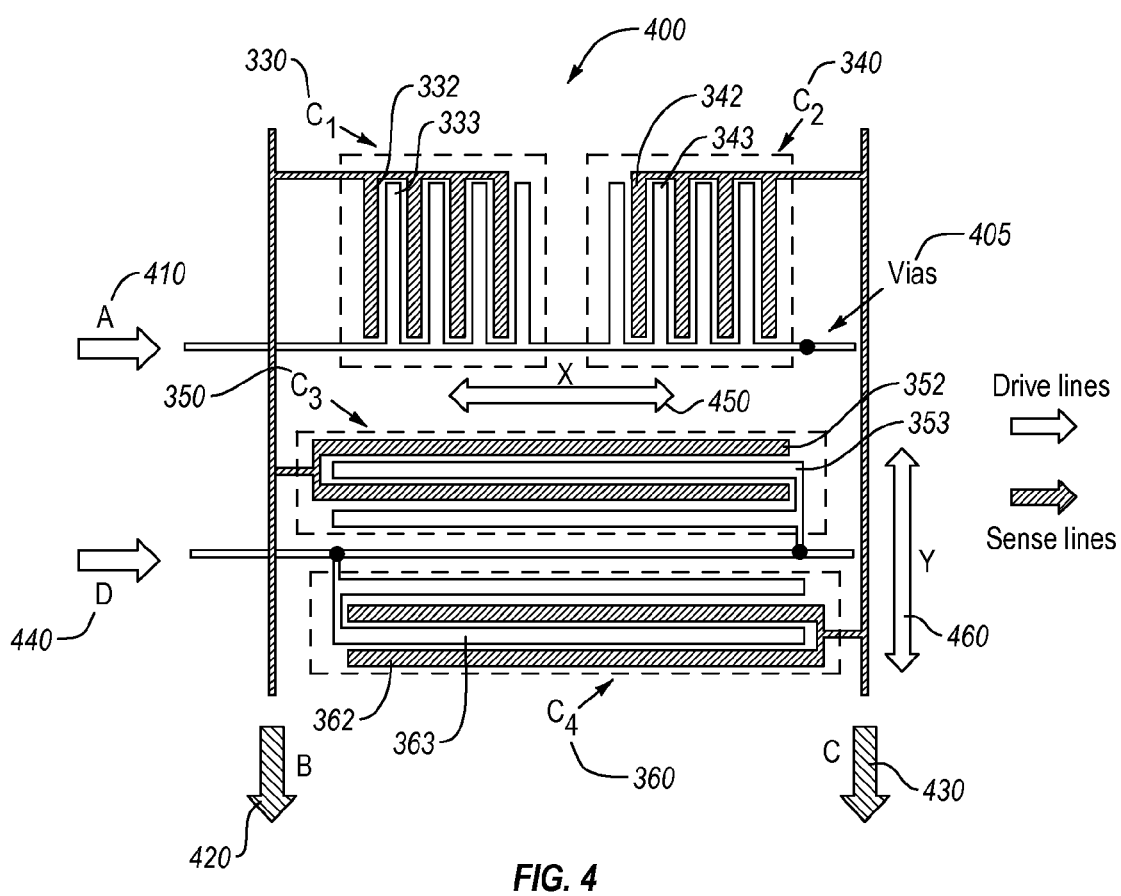
FIG. 4 illustrates an addressing scheme for the sensing cell according to the embodiments disclosed herein.

Attention is now given to FIG. 4, which illustrates an addressing scheme for the sensing cell 120 or 200. As illustrated, FIG. 4 shows the X-cell 310 and the Y-cell 320 without the floating electrodes. Thus, FIG. 4 shows the comb-like fingered sense electrodes 332, 342, 352, and 362 interlocked or interconnected with the comb-like fingered drive electrodes 333, 343, 353, and 363. The figure further shows the x-direction 450 and the y-direction 460 and the vias 405 that connection the drive electrodes as previously described.

FIG. 4 also illustrates two drive lines 410 and 440 (also illustrated as A and D) and two sense lines 420 and 430 (also illustrated as B and C). Because there is no overlap of any two same-axis finger capacitors along the vertical direction, the orthogonal X-cell 310 and Y-cell 320 may be interrogated using a dual row select, dual column readout multiplexing scheme. This efficiently reduces the number of required connections to the array 100 and increases array density.

The four multi-fingered capacitors 330-360 of the sensing cell 200 may be measured by individually addressing or exciting each of the two drive lines 410 and 440 while reading on the vertical sense lines 420 and 430. When drive line 410 is set to high, sense line 420 is grounded. The pulsed current through capacitors 330 and 340 may be measured using an integrator circuit discussed in more detail to follow. In one embodiment, the column readout lines 420 and 430 may be set to be virtual ground by a readout circuit in order to eliminate any contributions from multi-fingered capacitors 350 and 360 in the readout cycle. In one embodiment, the readout circuit output may result in 338 normal stress sensing pixels and 169 shear sensing pixels in each direction (x/y).

When the sensing cell 120 or 200 is subjected to both normal and sheer force, the displacements in the x, y, and z directions may be determined by the following equations that use the nomenclature of FIG. 4:

$$x = \frac{d[(C_{AC} * C_{AB}^0) - (C_{AB} * C_{AC}^0)]}{(C_{AC} * C_{AB}^0) + (C_{AB} * C_{AC}^0)} \quad (4)$$

$$y = \frac{d[(C_{DC} * C_{DB}^0) - (C_{DB} * C_{DC}^0)]}{(C_{DC} * C_{DB}^0) + (C_{DB} * C_{DC}^0)} \quad (5)$$

$$z = \frac{t[2N_F(C_{DB}^0 * C_{DC}^0) - (C_{AC} * C_{AB}^0) - (C_{AB} * C_{AC}^0)]}{(C_{AC} * C_{AB}^0) + (C_{AB} * C_{AC}^0)} \quad (6)$$

$$= \frac{t[2N_F(C_{DB}^0 * C_{DC}^0) - (C_{DC} * C_{DB}^0) - (C_{DB} * C_{DC}^0)]}{(C_{DC} * C_{DB}^0) + (C_{DB} * C_{DC}^0)}$$

where t is the dielectric thickness and $N_f$ is the number of floating electrodes as in the previous equations and $C_{AB}^0$, $C_{AC}^0$, $CS_{DB}^0$, and $C_{DC}^0$ are the cumulative of initial capacitances formed between the drive and floating electrodes and the sense and floating electrodes connected in series as shown in the following equations:

$$C_{AB}^0 = \frac{C_{AF}^0 * C_{FB}^0}{C_{AF}^0 * C_{FB}^0} \quad (7)$$

$$C_{AC}^0 = \frac{C_{AF}^0 * C_{FC}^0}{C_{AF}^0 + C_{FC}^0} \quad (8)$$

$$C_{DB}^0 = \frac{C_{DF}^0 * C_{FB}^0}{C_{DF}^0 + C_{FB}^0} \quad (9)$$

$$C_{DC}^0 = \frac{C_{DF}^0 * C_{FC}^0}{C_{DF}^0 + C_{FC}^0} \quad (10)$$

where $C_{AF}^0$ and $C_{DF}^0$ are the initial unstressed capacitances between the drive and floating electrodes and $C_{FB}^0$ and $C_{FC}^0$ are the initial unstressed capacitances between the sense and floating electrodes.

Figure 6A:
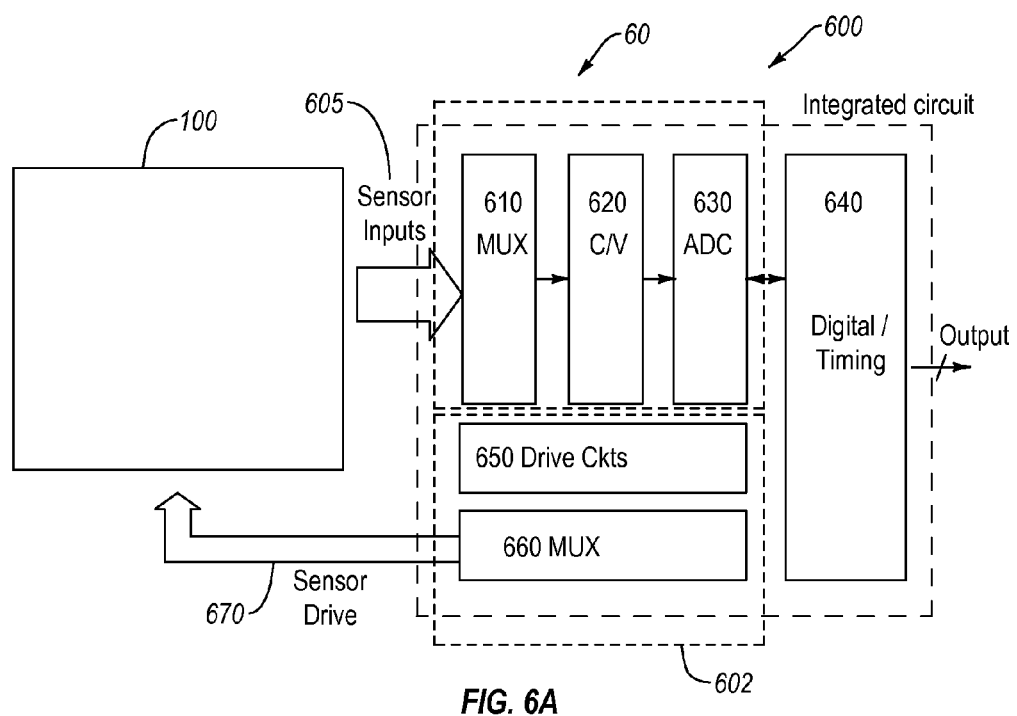
FIGS. 6A and 6B illustrate a sense and drive system according to the embodiments disclosed herein.

FIG. 6A illustrates an embodiment of a sense and drive system 600 that may be used to drive the array 100 and to sense the output of the array 100. As illustrated, system 600 is shown electrically coupled to the array 100 by sense lines 605, which may correspond to the sense lines previously discussed, and by drive lines 670, which may correspond to the drive lines previously discussed. The system 600 includes a sense portion 601 that is at least partially comprised of a multiplexer (MUX) 610, a capacitor-to-voltage converter 620, an analog-to-digital converter 30 and a digital timing block 640. It will be appreciated that the sense portion 601 may correspond to the sense system 140.

System 600 also includes a drive portion 602 that is at least partially comprised of the digital timing block 640, drive circuits 650, and a MUX 660. It will be appreciated that the drive portion 602 may correspond to the drive system 130 and provides the multiplexed driving signals previously discussed. It will also appreciated that the system 600 (and the sense and drive portions 601 and 602) may include additional elements as needed and that illustrated elements may be implemented in any reasonable way using either hardware, software, or a combination of hardware and software.

In one embodiment, the system 600 is implemented as a front-end multiplexer 610 that can sequentially connect 169 individual sensing cells 100 of the FTI to a capacitance-to-voltage (C/V) converter 620 followed by a 12-bit ratio-independent algorithmic analog-to-digital converter (ADC) 630 with a sampling of 66.7 k-samples/s to digitize the output signal. The digital/timing block 640 controls the system timing and also provides digital data with a synchronization clock.

Figure 6B:
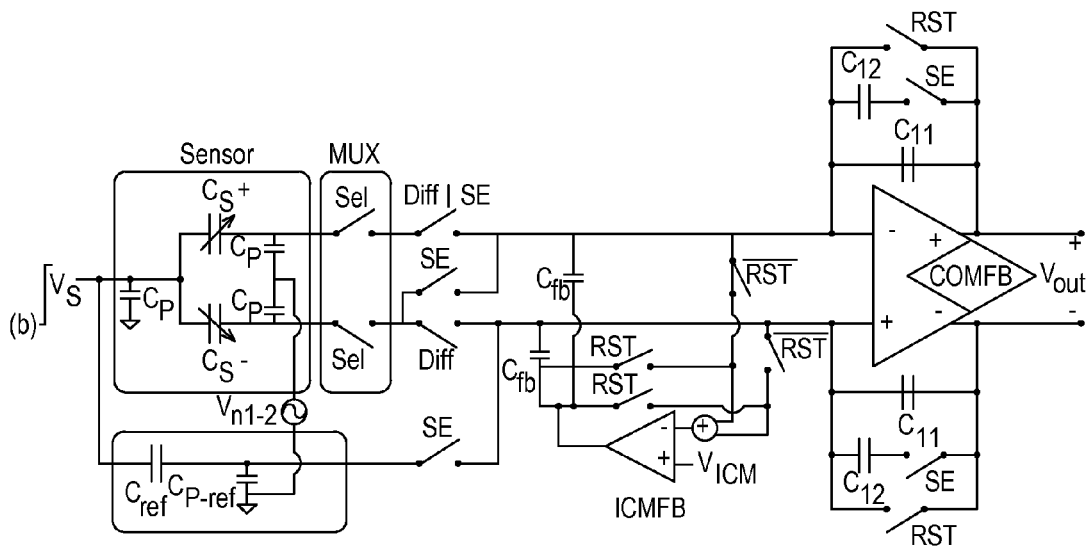

FIG. 6B illustrates an embodiment of a schematic of the front-end C/V design. The capacitive sensing units can be configured by the switches to achieve differential shear strain sensing along the x- and y-axes and single-ended z-axis normal stress sensing. The single-ended z-axis normal stress sensing circuitry uses a programmable on-chip reference capacitor to provide a close matching (1.625 pF) to the sensing cell nominal capacitance value.

When the circuit is configured in single-ended mode, the voltage at the output of the first stage amplifier is expressed as:

$$V_{out-Z} = \frac{(C_S^+ + C_S^-) - C_{ref}}{C_{I1} + C_{I2}} \cdot V_S \quad (11)$$

When the circuit is configured in the differential mode, the output of the first stage amplifier is expressed as:

$$V_{out-X} = \frac{(C_S^+ + C_S^-)}{C_{I1}} \cdot V_S \quad (12)$$

where $C_S^+$ and $C_S^-$ are the sensor capacitances of a single node in the FTI, $C_{I1}$ and $C_{I2}$ are integrating capacitances of the C/V converter, $C_{ref}$ is the programmable reference capacitor and $V_s$ is the stimulation voltage amplitude.

The amplifier is a two-stage fully differential design with 129 dB open-loop gain to satisfy requirements for 12-bit settling. The output of the first stage of the C/V converter is further amplified by a factor of 2.5 to achieve a signal amplitude matching the input range of the ADC. A fully differential 12-bit cyclic ADC sampled at 67 k-samples per second is designed to digitize the C/V converter output waveform. The system is designed to read the 169 sensing cells of the array 100 with a total scanning time of 10 ms. In the embodiment, the entire electronic detection system is designed in a 0.35 μm CMOS process while dissipating 3 mW from a 3V supply.

The FTI 100 may be used to detect the motion of an object placed on top of it, or alternatively the motion of the FTI relative to a stationary object in contact. The latter setup may be applicable for measurement of ground velocity with respect to a moving foot, for example as a navigational aid for pedestrian navigation systems. In such applications, the capacitance measurements of the FTI 100 would be converted to object location and velocity.

A simple method is realized through the definition of centroid coordinates:

$$x_c = \frac{\sum x_i V_i}{\sum V_i}, \quad (13)$$

$$y_c = \frac{\sum y_i V_i}{\sum V_i}$$

where $x_i$, $y_i$ are the coordinates of each sensing cell in the FTI 100. When the object moves, the capacitor voltages change and so does the centroid location. Equation (13) is one of many types of centroids that may be defined. The object velocity can next be obtained via numerical differentiation of smoothed versions of equation (13). In the implementation of the current embodiment, a fourth-order polynomial fit with regular residual analysis is utilized, which provides a smooth estimate of the object velocity.

It may also be desirable to determine a formula that relates the sensing cell pitch and capacitance resolution to object location resolution. Such a formula may be determined via interpolation. For example, suppose that an object is rolling on top of the FTI 100 producing a normal stress profile between two adjacent sensing cells 120, labeled 1 and 2. It is desirable to define the edge of the object as the location where the normal stress profile is equal to a fixed normal stress threshold $P_T$. If it is assumed that the object is large compared to the sensing cell pitch, it approximately produces a linear gradient in normal stress. Due to linear approximation, the edge location is simply:

$$x_e = \frac{P_T - P_1}{P_2 - P_1} \cdot L = \frac{V_T - V_1}{V_2 - V_1} \cdot L \quad (14)$$

where $x_e$ is measured with respect to the center of sensing cell 1 and L is the sensing cell pitch.

Next, it is desirable to determine the minimum detectable displacement $\Delta x_e$ and its relationship to the capacitance and voltage resolution of the readout circuitry such as that discussed previously in relation to FIG. 6. If it is assumed that the object moves, that the normal stress $P_2$ is constant and that $V_1 \ll V_2$, it can be shown that:

$$\Delta x_e = \frac{\Delta P_2}{P_2 - P_1} \cdot L \approx \frac{\Delta V_2}{V_2} \cdot L = \frac{L}{2^N} \quad (15)$$

where N is the number bits of a readout ADC such as ADC 630. The minimum resolvable displacement is thus the sensing cell pitch times the ADC resolution. If the profile spreads over several sensing cells instead of two, equation (13) should be modified accordingly, leading to a similar relation.

Using equations 13-15, estimates of the object velocity may also be determined. For a given FTI 100 scan time $T_s$, the minimum detectable average velocity is:

$$\left(\frac{\Delta x_e}{\Delta t}\right)_{min} = \frac{\Delta x_e}{T_2} \approx \frac{L}{2^N T_s} \quad (16)$$

The calculations outlined in equations 13-16 define a position; therefore, the velocity bound of equation 16 can be used in an averaged sense. The array data indicates that if the object displacement is greater than that specified in equation 15 it will be detected.

Example Fabrication Method

Figure 5:
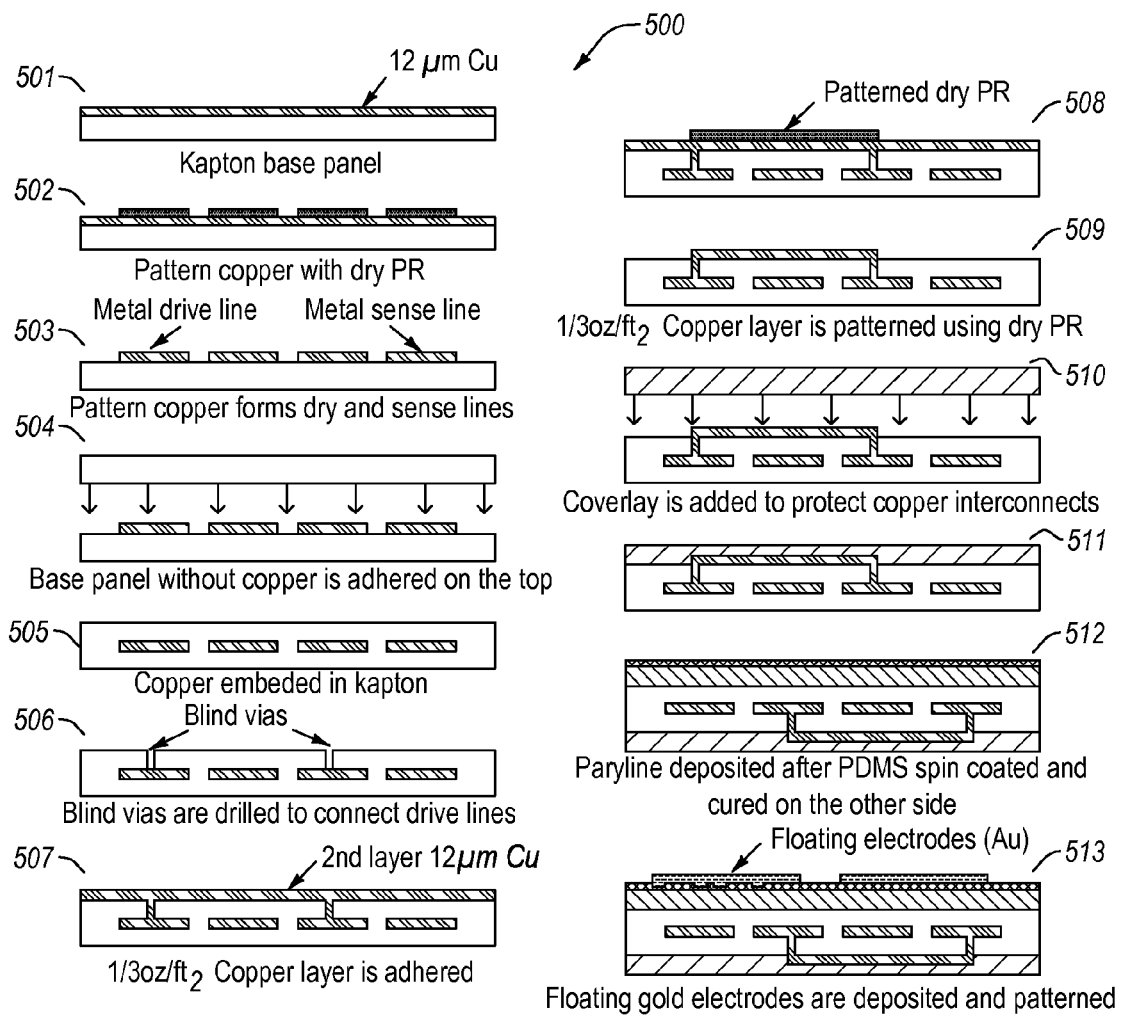
FIG. 5 illustrates a simplified process flow for the fabrication of a flexible printed circuit board (FPCB) and a floating electrode over an elastomeric dielectric material that implements the sensing cells according to the embodiments disclosed herein.

In some embodiments, a combination of flex circuit manufacturing and micro-fabrication techniques may be used to fabricate the sensing cells 120 of the array 100. FIG. 5 shows one embodiment of a simplified process flow for the fabrication of a flexible printed circuit board (FPCB) and a floating electrode over an elastomeric dielectric material that implements the sensing cells 120. It will be appreciated that the process flow shown in FIG. 5 is only one of multiple process flows and is therefore not to be limiting of the embodiments disclosed herein.

In the process flow a FPCB is fabricated by building a flexible 25 μm Kapton AP7164E panel (501) with 12 μm copper (⅓ oz/ft$_2$) hard rolled with dry photoresist and patterned with the circuit imagery (502). Drive and sense lines are formed by patterning copper on the base panel (503).

In the process flow, a second 25 μm AP7164E panel (without copper) is adhered using a heat-pressure process to the existing flex substrate (504). This results in the copper drive and sense lines being embedded in the Kapton panels (505). Blind via holes may then bedrilled through the second AP7164E panel layer to connect all the drive lines in a row (506).

A second layer of 12 μm copper (⅓ oz/ft$_2$) is adhered to the FPCB and patterned using the dry photoresist (507-509). The second layer of copper is covered by a 25 μm Pyralux FR coverlay (510-511). This coverlay layer is applied on the entire surface except at the end of the cable to expose metal lines that may be used to connect to sense system such as 140 and/or a drive system such as system 130. Various other processing may be performed on the exposed metal lines to ensure that they are able to properly connect to the sense and drive systems 130 and 140.

In the process flow (512), a 15 μm PDMS (Sylgard 184, polymer to curing agent of 10:1) with Young's modulus of ~800 kPa is spin-coated and cured (at 60 degrees C., overnight) on the first layer of the AP7164E panel to form the elastomeric dielectric material. A Parylene layer (1 μm) is deposited on the PDMS layer using Parylene Deposition System (SCS PDS 2010). A 2 μm photoresist (Shipley 1813) is spin-coated and backed at 100° C. for 5 minutes. It is patterned by a UV light exposure dose of 150 mJ/cm3 and development using 352 developer. The Parylene layer helps in adhesion of the photoresist to the surface.

During the fabrication of the FPCB assembly, the material may undergo multiple heat rolling steps and this may cause shrinkage. Multiple masks to pattern the floating electrodes may be prepared to compensate for this variable shrinkage and the mask that matches closest may be chosen for the floating electrodes. In one embodiment, the shrinkage in the FPCB assembly varied from 100 μm to 300 μm. Four masks in increments of 50 μm were prepared to compensate for the shrinkage due to heat cycles.

In the process flow (513), Chromium (20 nm) and gold (150 nm) floating electrodes may be deposited by e-beam evaporation. Unnecessary Cr/Au (and underlying photoresist) is removed by ultrasonication of the structure in acetone. The Parylene layer also helps adhesion of floating electrode to the structure.

Experimental Results

Figure 7:
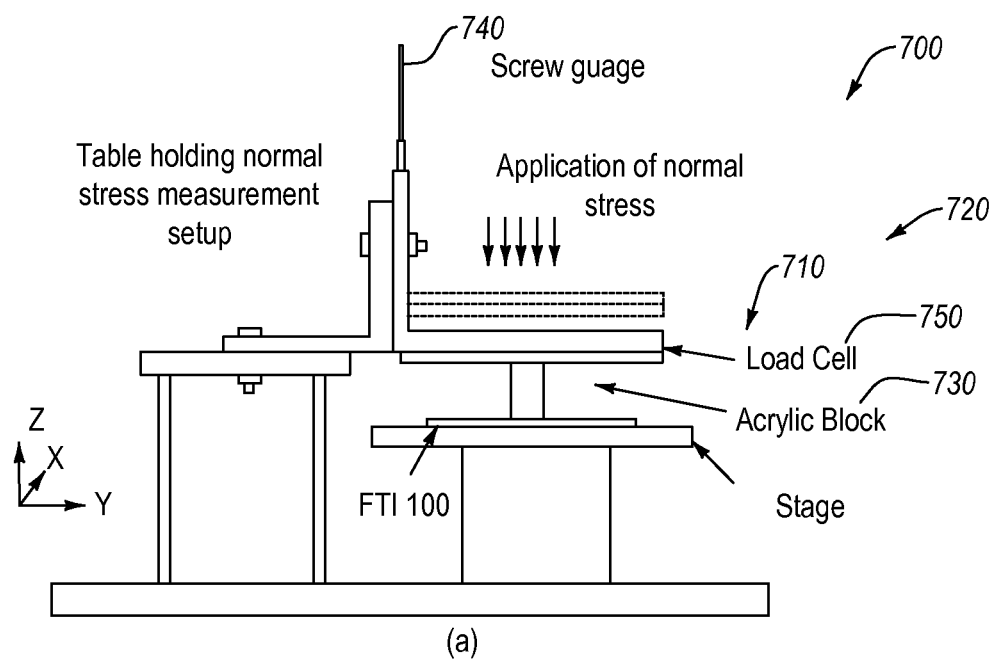
FIG. 7 illustrates test system for characterizing normal stress acting on the flexible tactile imager array according to the embodiments disclosed herein.

Attention is now given to FIG. 7, which shows an embodiment of a test system 700 for characterizing normal stress acting on the flexible tactile imager array 100. In the embodiment, the test system 700 may include two main components, (1) a normal stress application setup 710 and (2) a motorized stage 720. The normal stress application setup may include a translation stage setup vertically with a metal plate at 90 degree angle. This setup is able to move in the Z-direction for application of normal load.

The load is applied on a rectangular acrylic block 730, which may be 30×17.8×14 mm cubed, that rests on the FTI 100 with the help of a screw gauge 740. The load applied on the block is measured by a resistive load cell 750 placed on the bottom side of the metal plate, as shown in FIG. 7. The FTI 100 is placed on a movable stage that is on a single-axis stepper motor. Using this setup, the voltage change versus applied load on an area covering six sensing cell may be obtained.

Figure 8A:
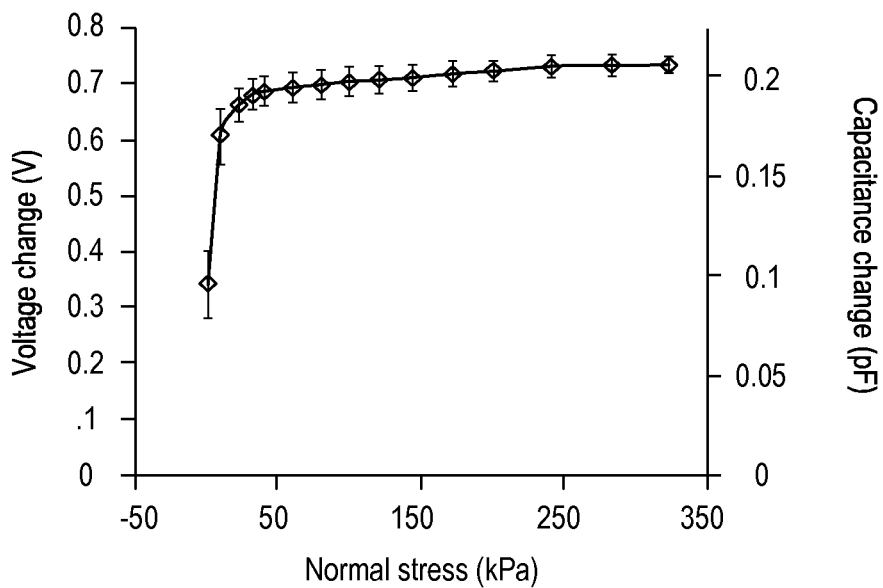
FIG. 8A illustrates voltage change and capacitance change variation from cell to cell when normal stress is applied to the FTI array according to the embodiments disclosed herein.

FIG. 8A illustrates the voltage change and capacitance change variation from cell to cell when normal stress is applied to the FTI array 100. Initially, the measured change is high for small stress. However, the slope is reduced as the PDMS layer becomes stiffer with increasing stress.

Figure 8B:
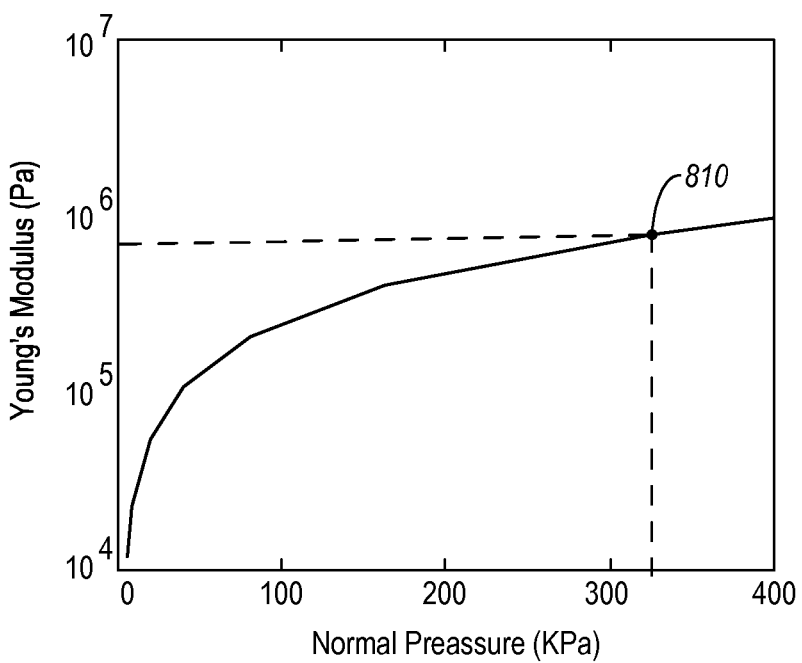
FIG. 8B illustrates the change in Young's modulus when normal stress is applied to the FTI array according to the embodiments disclosed herein.

From the output voltage change, the Young's modulus of the elastomeric PDMS layer can be calculated and a relationship between Young's modulus and normal stress is plotted in FIG. 8B. The plot suggests that PDMS exhibits a highly nonlinear stress-strain relationship/Young's modulus and could be due to its visco-elastic nature. Also, some of the initial surge in voltage change can be attributed to cross coupling of the dielectric acrylic block that is used to apply load on the FTI 100.

Initially (<10 kPa), the sensitivity of the sensing cell is high and reduces with increasing normal stress. The Young's modulus is about 20 kPa for an applied normal stress of 8 kPa and reaches to about 1 MPa for 400 kPa normal stress. The measured nominal capacitance of each X-cell/Y-cell is 1.65 pF. The additional capacitance (compared to a calculated value) is likely contributed by residual parasitic capacitance associated with the measurement setup and/or reduced dielectric layer thickness during fabrication process. The change in capacitance due to a normal stress of 320 kPa is about 760 kPa as shown in FIG. 8B at 810.

Figure 9:
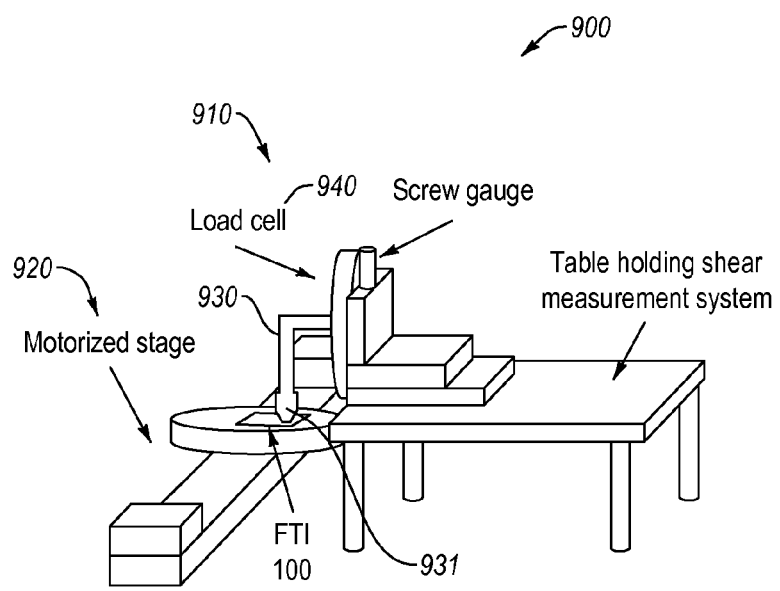
FIG. 9 illustrates a test system for characterizing shear stress acting on the flexible tactile imager array.

FIG. 9 shows an embodiment of a test system 900 for characterizing shear stress acting on the flexible tactile imager array 100. In the embodiment, the test system 900 may include two main components, (1) a shear stress application setup 910 and (2) a motorized stage 920. The shear application system of the embodiment used a metal L-joint 930 with a flat rubber end-cap 931 attached to a vertically mounted load cell 940. The rubber end cap 931 may help in avoiding metal contact to the Au floating electrodes of the FTI 100 and may also help in providing sufficient friction to generate shear.

Shear measurements were performed as follows. First, a known normal load was applied on the FTI 100 by moving the L-joint 930 downward in Z-direction, and then reading on then setting the load cell 940 to zero. Then, the single axis stepper motor moved the motorized stage 920 in small increments in the x-direction and the y-direction in order to apply shear on the FTI 100.

Figure 10A:
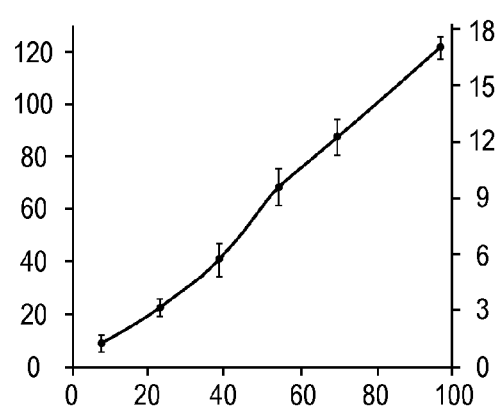
FIGS. 10A and 10B illustrate voltage change and capacitance change variation from cell to cell when shear stress is applied to the FTI array according to the embodiments disclosed herein.
Figure 10B:
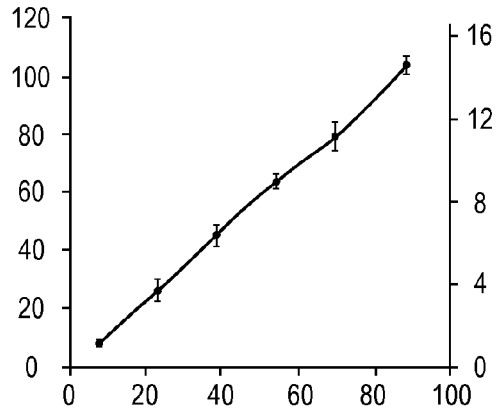

Shear values from the load cell 940 and changes in output voltage value and capacitance value from the readout circuitry are plotted in FIGS. 10A and 10B. As shown FIG. 10A illustrates the changes for shear force in the x-direction and FIG. 10B illustrates the changes for shear force in the y-direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A flexible tactile imager for measuring normal force and shear force in a first and second direction comprising:
a flexible printed circuit board;
a comb-like fingered sense electrode patterned on a layer of the flexible printed circuit board;
a comb-like fingered drive electrode patterned on the same layer of the flexible circuit board as the sense electrode;
a comb-like fingered floating electrode patterned above a deformable dielectric material;
a deformable dielectric material sandwiched between the comb-like fingered sense and drive electrodes, wherein the deformable dielectric material allows for lateral movement of the comb-like fingered floating electrode with respect to the comb-like fingered drive electrode and the comb-like fingered sense electrode;
a first capacitance formed between the comb-like fingered sense electrode and the comb-like fingered floating electrode; and
a second capacitance formed between the comb-like fingered drive electrode and the comb-like fingered floating electrode.

2. The flexible tactile imager of claim 1, wherein the comb-like fingered floating electrode is patterned such so as to substantially cover the entire sense electrode and to partially cover the drive electrode.

3. The flexible tactile imager of claim 1, wherein a portion of the drive electrode that is not covered by the comb-like floating electrode forms an offset region, the offset region at least partially allowing the measurement of the shear force in the first and second directions.

4. The flexible tactile imager of claim 1, wherein a change in the first or second capacitances due to the deformable dielectric material being deformed is used to measure the shear force and the normal force.

5. The flexible tactile imager of claim 1, wherein the deformable dielectric material is PDMS.

6. The flexible tactile imager of claim 1, wherein an adhesion layer is positioned between the deformable dielectric material and the comb-like fingered floating electrode.

7. The flexible tactile imager of claim 1, wherein the comb-like figured sense electrode and the comb-like fingered drive electrode are interwoven.

8. The flexible tactile imager of claim 1, wherein the comb-like fingered sense electrode is coupled to a sense line that is used to measure the shear and normal force.

9. The flexible tactile imager of claim 1, wherein the comb-like fingered drive electrode is coupled to a drive line that is used to electrically drive the flexible tactile imager.

10. The flexible tactile imager of claim 1, wherein flexible printed circuit board includes a plurality of layers.

11. A flexible tactile imager comprising:
an array of sensing cells configured to measure shear force and normal force substantially simultaneously, each sensing cell comprising:
a first sub-cell including a plurality of multi-fingered capacitors configured to measure the shear force in a first direction and to measure the normal force, the first sub-cell; and
a second sub-cell configured including a plurality of multi-fingered capacitors to measure the shear force in a second direction that is orthogonal to the first direction and to measure the normal force,
wherein the multi-fingered capacitors include:
a comb-like floating electrode for receiving the shear and normal force;
a flexible printed circuit board;
a comb-like fingered sense electrode patterned on a layer of the flexible printed circuit board;
a comb-like fingered drive electrode patterned on the same layer of the flexible circuit board as the sense electrode;

a deformable dielectric material positioned above the comb-like fingered sense and drive electrodes;

the comb-like fingered floating electrode patterned above the deformable dielectric material;

a first capacitance formed between the comb-like fingered sense electrode and the comb-like fingered floating electrode;

a second capacitance formed between the comb-like fingered drive electrode and the comb-like fingered floating electrode; and wherein:
- a portion of the drive electrode that is not covered by the comb-like floating electrode forms an offset region, and
- a movement of the offset region indicates an application of a shear force in the same direction as the movement.

12. The flexible tactile imager of claim 11, wherein the comb-like fingered floating electrode is patterned such so as to substantially cover the entire sense electrode and to partially cover the drive electrode.

13. The flexible tactile imager of claim 11, wherein the array includes 676 multi-fingered capacitors arranged in 169 sensing cells.

14. The flexible tactile imager of claim 11, wherein each sensing cell comprises four multi-fingered capacitors.

15. The flexible tactile imager of claim 11, wherein a capacitance addition of the plurality of multi-fingered capacitors of the first or second sub-cells is used to measure the normal force.

16. The flexible tactile imager of claim 11, wherein a capacitance difference between the plurality of multi-fingered capacitors of the first sub-cell is used to measure the shear force in the first direction.

17. The flexible tactile imager of claim 11, wherein a capacitance difference between the plurality of multi-fingered capacitors of the second sub-cell is used to measure the shear force in the second direction.

18. The flexible tactile imager of claim 11, wherein the first sub-cell is orientated orthogonally to the second the sub-cell.

* * * * *